United States Patent

Esch

[15] 3,707,664
[45] Dec. 26, 1972

[54] NOVEL BATTERY DISCHARGE SENSOR AND CONTROL

[72] Inventor: Fred H. Esch, Silver Spring, Md.

[73] Assignee: Communications Satellite Corporation, Washington, D.C.

[22] Filed: April 6, 1971

[21] Appl. No.: 131,610

[52] U.S. Cl. .......................... 320/18, 320/6, 320/48
[51] Int. Cl. ................................................. H02j 7/00
[58] Field of Search .................. 320/13, 20, 6, 18, 48

[56] References Cited

UNITED STATES PATENTS

| | | | |
|---|---|---|---|
| 3,258,670 | 6/1966 | Piechon | 320/6 |
| 3,321,690 | 5/1967 | McCarthy et al. | 320/13 X |
| 3,454,859 | 7/1969 | Ford et al. | 320/13 X |
| 3,348,117 | 10/1967 | Howden | 320/18 |

*Primary Examiner*—J. D. Miller
*Assistant Examiner*—Robert J. Hickey
*Attorney*—Sughrue, Rothwell, Mion, Zinn & Macpeak

[57] ABSTRACT

In an energy storage device of the type which comprises a plurality of series connected voltage cells such as a series of alkaline battery cells, the discharge of the cells is prevented from reaching a dangerously low level by monitoring the voltage level of selected ones of the cells which have a lower energy capacity than the remaining standard cells in the storage device. The selected cells, having a lower maximum capacity, will reach a detectable degree of discharge first and circuit means are provided for detecting when the full discharge of these cells is about to be reached. When detection occurs the selected cells are bypassed and signals are sent out to indicate that the overall energy storage device has reached a low level of charge.

11 Claims, 1 Drawing Figure

PATENTED DEC 26 1972　　　　　　　　　　　3,707,664
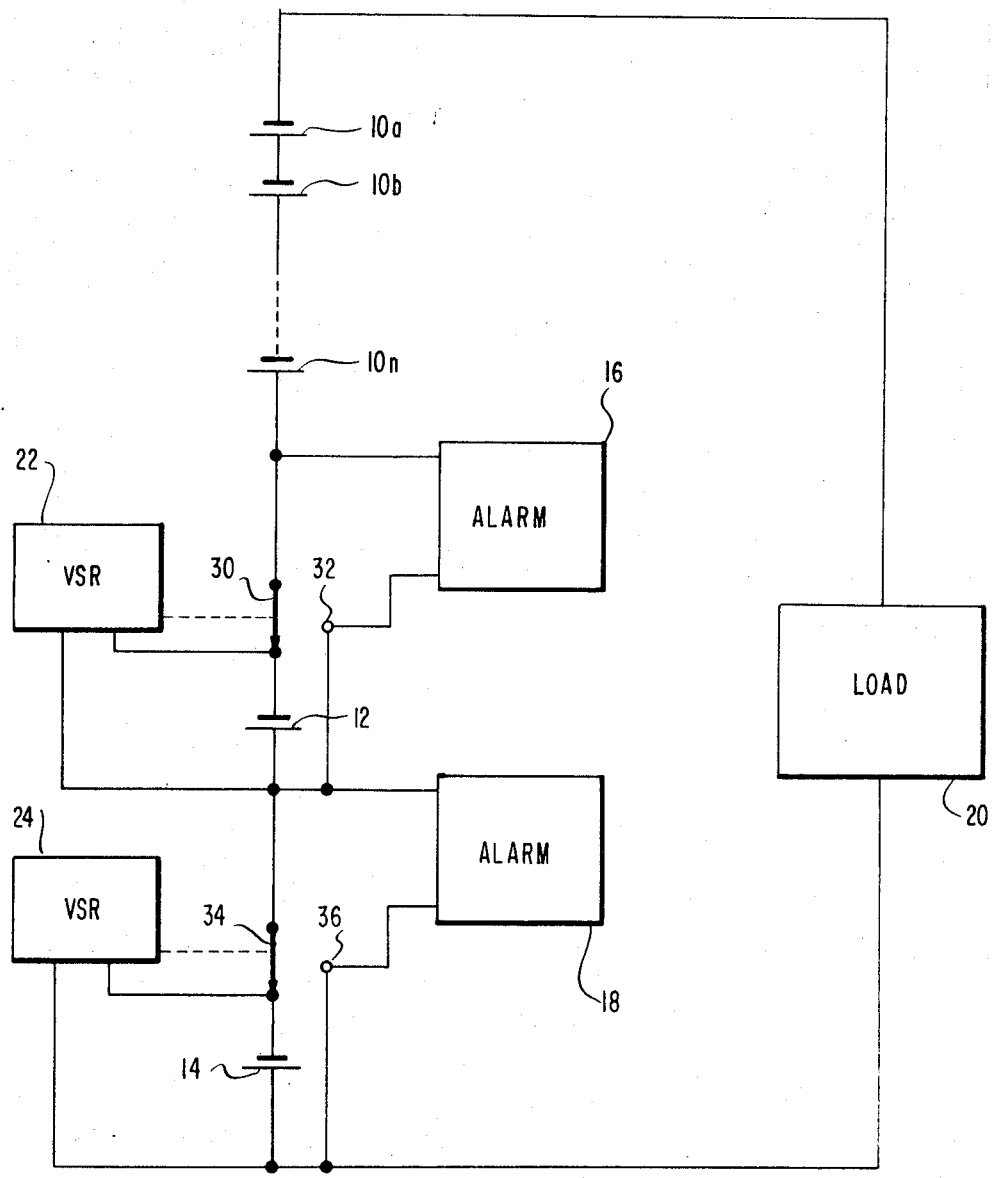
INVENTOR
FRED H. ESCH
BY Sughrue, Rothwell, Mion,
　　　Zinn & Macpeak
ATTORNEYS

NOVEL BATTERY DISCHARGE SENSOR AND CONTROL

BACKGROUND OF THE INVENTION

Electrical energy storage devices have been used in many applications, such as in spacecraft applications, in the past few years and usually take the form of a series of alkaline battery cells. In most cases, nickel-cadmium cells using potassium hydroxide as an electrolyte have been used. Electro-chemical couples of other types, such as silver-zinc, may also be used. All of these devices, however, share a common problem. It is normally quite difficult to determine the state of charge of batteries composed of these sorts of cells, particularly when the battery experiences variations in thermal conditions and is called upon for supply energy at other than a constant rate.

In order to prevent the cells for completely discharging, monitoring means are usually provided to detect the charge level of at least selected ones of the cells. However, this has proven to be undesirable since the discharge characteristics of individual cells may change with age. Should some unmonitored cells develop a higher discharge threshold over a period of time they may pass the discharge threshold before the monitored cells indicate the need for charging the battery.

SUMMARY OF THE INVENTION

In accordance with the present invention, selected cells of the series connected cells are monitored to provide an indication of the discharge level of the overall battery. However, the selected cells differ from the remaining cells which form the storage battery by having a charge capacity which is significantly less than the charge capacity of the remaining storage cells. This insures that the cells being monitored will always reach the minimum discharge level prior to any of the unmonitored cells and thereby avoid the problem referred to above in the prior art section. Circuit means may be provided for indicating when the monitored cells reach a charge level just above the minimum acceptable level or just above complete discharge. Circuit means may also be provided for bypassing the monitored cells when the latter indication occurs to prevent reverse charge with the accompanying and often disastrous results of hydrogen or other gas generation and overpressure.

BRIEF DESCRIPTION OF THE DRAWINGS

The only FIGURE is a schematic drawing illustrating a preferred embodiment of the present invention.

DETAILED DESCRIPTION OF THE PREFERRED EMBODIMENT

In the only drawing it is assumed that the energy storage device comprises nickel-cadmium cells 10a through 10n plus additional cells 12 and 14. The only difference between cells 12 and 14 and the cells 10a through 10n is in their maximum storage capacity. Cell 12 is set to have a storage capacity which may be, for example, less than 95 percent of the storage capacity of the cells 10 and cell 14 has a storage capacity which may be, for example, less than 95 percent of the storage capacity of the cell 12. Two monitored cells, 12 and 14, are shown in the preferred embodiment merely to provide a double warning system. For example, when the cell 14, having the lowest storage capacity, discharges to a minimum acceptable level, a first alarm may be transmitted or indicated or telemetered to a ground station in the case of spacecraft application indicating an initial warning. The alarm which is triggered by cell 12 discharging to a minimum acceptable level may provide a final warning. Although circuits 16 and 18 are shown only in block diagram form, it will be appreciated by anyone of ordinary skill in the art they may comprise indicators, transmitters, telemetering circuits or circuits which automatically initiate battery charging apparatus to charge the cells.

Actuation is provided by voltage sensitive relays 22 and 24 of known type which are connected respectively across the cells 12 and 14. When 14 reaches the low level, for example one volt, the voltage sensitive relay 24 will be actuated causing the switch arm 34 to make contact with terminal 36. It will be noted that when switch arm 34 makes contact with terminal 36, it not only short circuits the input to the alarm means, thereby actuating the alarm circuit, it also disconnects cell 14 from the load and remaining cells of the battery thereby preventing reverse charge of the cell 14 with its consequent deleterious effects. A similar circuit is provided for the cell 12, and as pointed above, the circuitry for cell 12 will be actuated following the circuitry for cell 14 simply because the charge on cell 12 will drop below the minimum acceptable level after the discharge on cell 14 drops below said minimum acceptable level. The voltage sensitive relay 22 will actuate when the charge on cell 12 reaches a minimum level, for example one volt, thereby causing the switch arm 30 to make contact with terminal 32. When switch arm 30 makes contact with terminal 32 the alarm circuit 16 will be actuated and the cell 12 will be disconnected from the load and remaining cells. By disconnecting cells 12 and 14, the remainder of the storage system, which comprises the cells 10a through 10n, remains connected to the external circuitry which is illustrated generally by the load 20.

What is claimed is:

1. A battery condition sensing system comprising a first plurality of like voltage cells connected in series with each other, at least one additional cell connected in series with said first plurality of cells, said additional cell having a charge capacity significantly less than the charge capacity of each of said first plurality of cells, all of said series connected cells forming a battery which is connected to external circuitry including a load, means for monitoring the charge status of said battery by detecting the voltage across said additional cell, and switching means responsive to the actuation of said voltage monitoring means for disconnecting said additional cell from the series connection with said plurality of cells, and by passing cell whereby only the remaining cells continue to energize said load and indicating means actuated by said switching means for providing an indication that the battery has discharged to a warning level.

2. A battery condition sensing system as claimed in claim 1 wherein said additional cell has a maximum charge capacity of 95 percent or less of the maximum charge capacity of said other cells.

3. A battery condition sensing system as claimed in claim 2 wherein said monitoring means comprises a voltage sensitive relay connected across the terminals of said additional cell and actuated when the voltage of said additional cell reaches a predetermined fixed minimum.

4. A battery condition sensing system as claimed in claim 3 wherein said predetermined fixed minimum voltage level is set at such a value that said additional cell is switched out of the circuit including said battery prior to complete discharge of said additional cell.

5. A battery condition sensing system as claimed in claim 3 wherein all said cells are nickel-cadmium cells.

6. A battery condition sensing system comprising a first plurality of series connected voltage cells, a first additional voltage cell connected in series with said first plurality of cells having a maximum charge capacity of less than 95 percent of each of said first plurality of voltage cells, a second additional voltage cell connected in series with said first additional voltage cell having a maximum charge capacity of less than 95 percent of said first additional voltage cell, all said series connected cells being connected to an external circuit including a load, first detecting means connected across said second additional voltage cell and responsive to the voltage of said second additional cell dropping below a preset value for transmitting an initial warning, second detecting means connected across said first additional voltage cell responsive to the voltage of said first additional cell dropping below a preset value for transmitting a second warning, first switching means responsive to the actuation of said first detecting means for switching said second additional cell out of the circuit including said load, whereby only the remaining cells form said battery continue to energize said load, first indicating means actuated by said first switching means for providing an indication that said second additional cell has discharged to a warning level, and second switching means responsive to the actuation of said second detecting means for switching said first additional cell out of the circuit including said load whereby the remaining cells continue to energize said load and second indicating means actuated by said second switching means for providing an indication that said first additional cell has discharged to a warning level.

7. A battery condition sensing system as claimed in claim 6 wherein said first detecting means comprises a first voltage sensitive relay connected across the terminals of said second additional cell, said first relay being actuated when the voltage across said terminals of said second additional cell drops below said preset value for said second additional voltage cell.

8. A battery condition sensing system as claimed in claim 7 wherein said preset value of said second additional voltage cell is set at such a value that said second additional cell is short-circuited prior to complete discharge of said second additional cell.

9. A battery condition sensing system as claimed in claim 7 wherein said second detecting means comprises a second voltage sensitive relay connected across the terminals of said first additional cell, said second relay being actuated when the voltage across said terminals of said first additional cell drops below said preset value for said first additional voltage cell.

10. A battery condition sensing system claimed in claim 9 wherein said preset value of said first additional voltage cell is set at such a value that said first additional voltage cell is short circuited prior to complete discharge of said first additional cell.

11. A battery sensing system as claimed in claim 9 wherein all said cells are nickel-cadmium cells.

* * * * *